(12) United States Patent
Goto (10) Patent No.: US 8,746,892 B2
(45) Date of Patent: Jun. 10, 2014

(54) ILLUMINATING OPTICAL SYSTEM AND PROJECTOR DEVICE

(75) Inventor: Takao Goto, Tokyo (JP)

(73) Assignee: Nikon Corporation, Tokyo (JP)

(*) Notice: Subject to any disclaimer, the term of this patent is extended or adjusted under 35 U.S.C. 154(b) by 53 days.

(21) Appl. No.: 13/398,823

(22) Filed: Feb. 16, 2012

(65) Prior Publication Data

US 2012/0212711 A1    Aug. 23, 2012

(30) Foreign Application Priority Data

Feb. 17, 2011 (JP) ................. 2011-032291
Jan. 11, 2012 (JP) ................. 2012-003059

(51) Int. Cl.
G03B 21/00 (2006.01)

(52) U.S. Cl.
USPC .............. 353/31; 353/30; 353/37; 353/38; 353/94; 353/99; 362/230; 362/235

(58) Field of Classification Search
USPC .......... 353/20, 30, 31, 32, 33, 37, 38, 81, 94, 353/98, 99; 362/20, 230, 235, 293, 294, 362/373, 547; 359/489.09, 616, 619, 621; 349/5, 7–10
See application file for complete search history.

(56) References Cited

U.S. PATENT DOCUMENTS

| 5,164,854 | A | 11/1992 | Takanashi et al. | |
|---|---|---|---|---|
| 5,381,278 | A | 1/1995 | Shingaki et al. | |
| 2006/0132725 | A1* | 6/2006 | Terada et al. | 353/102 |
| 2010/0053559 | A1* | 3/2010 | Ushigome et al. | 353/20 |
| 2011/0187999 | A1* | 8/2011 | Hirata et al. | 353/20 |

FOREIGN PATENT DOCUMENTS

| EP | 1398659 A2 | 3/2004 |
|---|---|---|
| EP | 1508740 A1 | 2/2005 |
| JP | S61-090584 A | 5/1986 |
| JP | 2004-220015 A | 8/2004 |
| JP | 2005-116684 A | 4/2005 |
| JP | 2006-084962 A | 3/2006 |
| JP | 2007-507845 A | 3/2007 |
| JP | 2009-217060 A | 9/2009 |
| JP | 2010-049236 A | 3/2010 |
| JP | 2010-72136 A | 4/2010 |
| JP | 2010-072137 A | 4/2010 |
| WO | WO 2005/031445 A1 | 4/2005 |

OTHER PUBLICATIONS

Office Action issued Mar. 5, 2013, in Japanese Patent Application No. 2012-003059.
Extended European Search Report from European Patent Application No. 12155327.5, issued May 23, 2012.

\* cited by examiner

*Primary Examiner* — Sultan Chowdhury
(74) *Attorney, Agent, or Firm* — Miles & Stockbridge P.C.

(57) ABSTRACT

An illuminating optical system includes: a substantially rectangular-shaped light source that includes a light emitting surface with a split pattern formed thereat by a splitting line, the splitting line extending along a predetermined direction and splitting the light emitting surface into a plurality of separate areas; an illumination-target member that includes a rectangular radiation-target area; and an optical member in that condenses light departing the light emitting surface and radiates the condensed light toward the radiation-target area, wherein: an extent of uneven illumination attributable to an image of the split pattern at the light emitting surface of the light source, formed at the illumination-target member, is reduced.

13 Claims, 10 Drawing Sheets

ILLUMINATING OPTICAL SYSTEM AND
PROJECTOR DEVICE

INCORPORATION BY REFERENCE

The disclosures of the following priority applications are herein incorporated by reference:
Japanese Patent Application No. 2011-032291 filed Feb. 17, 2011
Japanese Patent Application No. 2012-003059 filed Jan. 11, 2012

BACKGROUND OF THE INVENTION

1. Field of the Invention

The present invention relates to an illuminating optical system and a projector device.

2. Description of Related Art

An image may be displayed on a screen or the like by a projector device known in the related art that radiates light originating from an illuminating optical system equipped with a light source constituted with a light emitting diode (LED) or the like onto a display element such as a reflective liquid crystal element (LCOS) or a micro-mirror device. For instance, Japanese Laid Open Patent Publication No. 2009-217060 teaches a projector device that condenses light from a light source through a lens with a free curved surface so as to reshape the section of the light into a rectangle and radiates the condensed light onto a reflective liquid crystal element (LCOS).

SUMMARY OF THE INVENTION

There is an issue yet to be effectively addressed in the related art in that if the light source includes a light emitting surface divided into a plurality of areas along a specific direction, an image patterned exactly as the light emitting surface is divided into the plurality of areas will be formed at an illumination-target member to result in uneven illumination.

According to the 1st aspect of the present invention, an illuminating optical system, comprises: a substantially rectangular-shaped light source that includes a light emitting surface with a split pattern formed thereat by a splitting line, the splitting line extending along a predetermined direction and splitting the light emitting surface into a plurality of separate areas; an illumination-target member that includes a rectangular radiation-target area; and an optical member in that condenses light departing the light emitting surface and radiates the condensed light toward the radiation-target area, wherein: an extent of uneven illumination attributable to an image of the split pattern at the light emitting surface of the light source, formed at the illumination-target member, is reduced.

According to the 2nd aspect of the present invention, an illuminating optical system comprises: a substantially rectangular-shaped light source that includes a light emitting surface with a split pattern formed thereat by a splitting line, the splitting line extending along a predetermined direction and splitting the light emitting surface into a plurality of separate areas; an illumination-target member that includes a rectangular radiation-target area ranging along a lengthwise direction in which longer sides thereof extend and along a crosswise direction in which shorter sides thereof extend; and an optical member that condenses light departing the light emitting surface so that an outline of an area irradiated with the light from the light emitting surface achieves a substantially rectangular shape and radiates the condensed light toward the radiation-target area by assuming different image formation positions of the light emitting surface along the longer sides and along the shorter sides of the radiation-target area, wherein: the light source is disposed so as to reduce an extent of uneven illumination attributable to an image of the split pattern at the light emitting surface of the light source formed at the illumination-target member.

According to the 3rd aspect of the present invention, an illuminating optical system that radiates light toward an illumination-target member that includes a rectangular radiation-target area ranging along a lengthwise direction in which longer sides thereof extend and along a crosswise direction in which shorter sides thereof extend, comprises: a substantially rectangular-shaped light source that includes a light emitting surface divided into a plurality of areas separated from one another with a splitting line extending along a specific direction; and an optical member that condenses light departing the light emitting surface and radiates the condensed light toward the radiation-target area, wherein: the optical member condenses the light from the light emitting surface so that an outline of an area irradiated with the light from the light emitting surface achieves a substantially rectangular shape by assuming different image formation positions of the light emitting surface along the longer sides and along the shorter sides of the radiation-target area; and the light source is disposed so that the shorter sides of the radiation-target area are set substantially parallel to the predetermined direction at the radiation-target area.

According to the 4th aspect of the present invention, the optical member of the illumination optical system according to the 3rd aspect may be constituted with a condenser lens.

According to the 5th aspect of the present invention, it is preferred that in the illuminating optical system according to the 4th aspect, an outline of the radiation-target area forms a shape that ranges along a direction corresponding to the crosswise direction over a length smaller than a length over which the shape ranges along a direction corresponding to the lengthwise direction.

According to the 6th aspect of the present invention, it is preferred that in the illuminating optical system according to the 4th aspect, the condenser lens includes at least one of; a lens with a free curved surface that condenses light so that the outline of the area irradiated with the light achieves a shape substantially identical to the shape of the radiation-target area, a cylindrical lens that condenses light so that the outline of the area irradiated with the light achieves an elliptical shape that contains the radiation-target area and an anamorphic lens that condenses light so that the outline of the area irradiated with the light achieves an elliptical shape containing the radiation-target area.

According to the 7th aspect of the present invention, the light source of the illuminating optical system according to the 4th aspect may include a light emitting diode.

According to the 8th aspect of the present invention, the light emitting diode in the light source of the illuminating optical system according to the 7th aspect may include at least one of; a white light emitting diode, a red color light emitting diode, a green color light emitting diode and a blue color light emitting diode.

According to the 9th aspect of the present invention, it is preferred that the illuminating optical system according to the 4th aspect further comprises: a polarization conversion element disposed between the condenser lens and the illumination-target member, which aligns directions along which light to be radiated onto the illumination-target member is polarized, wherein: a positive refractive power is achieved at, at least, one of optical surfaces of an optical member disposed between the condenser lens and the illumination-target member.

According to the 10th aspect of the present invention, a projector device is equipped with the illuminating optical system according to the 1st aspect.

According to the 11th aspect of the present invention, the illumination-target member of the projector device according to the 10th aspect may be constituted with a reflective liquid crystal element or a micro-mirror device.

According to the present invention, uneven illumination attributable to an image of a split pattern the light emitting surface formed at the illumination-target member can be prevented.

BRIEF DESCRIPTION OF THE DRAWINGS

FIG. 3 shows the polarization splitter element in side surfaces, with FIG. 3A providing a side surface in a plan view on a y-z plane taken from the light source side and FIG. 3B providing a side surface in a plan view on a y-z plane taken from the polarization beam splitter side.

FIG. 6 shows the light source and the display element in a plan views, with FIG. 6A providing a view of the light source taken from the side from which the illuminating light is output (from the polarization beam splitter side) and FIG. 6B providing a view of the display element taken from the display surface side (from the polarization beam splitter side).

DESCRIPTION OF PREFERRED EMBODIMENTS (First Embodiment)

Figure 1:
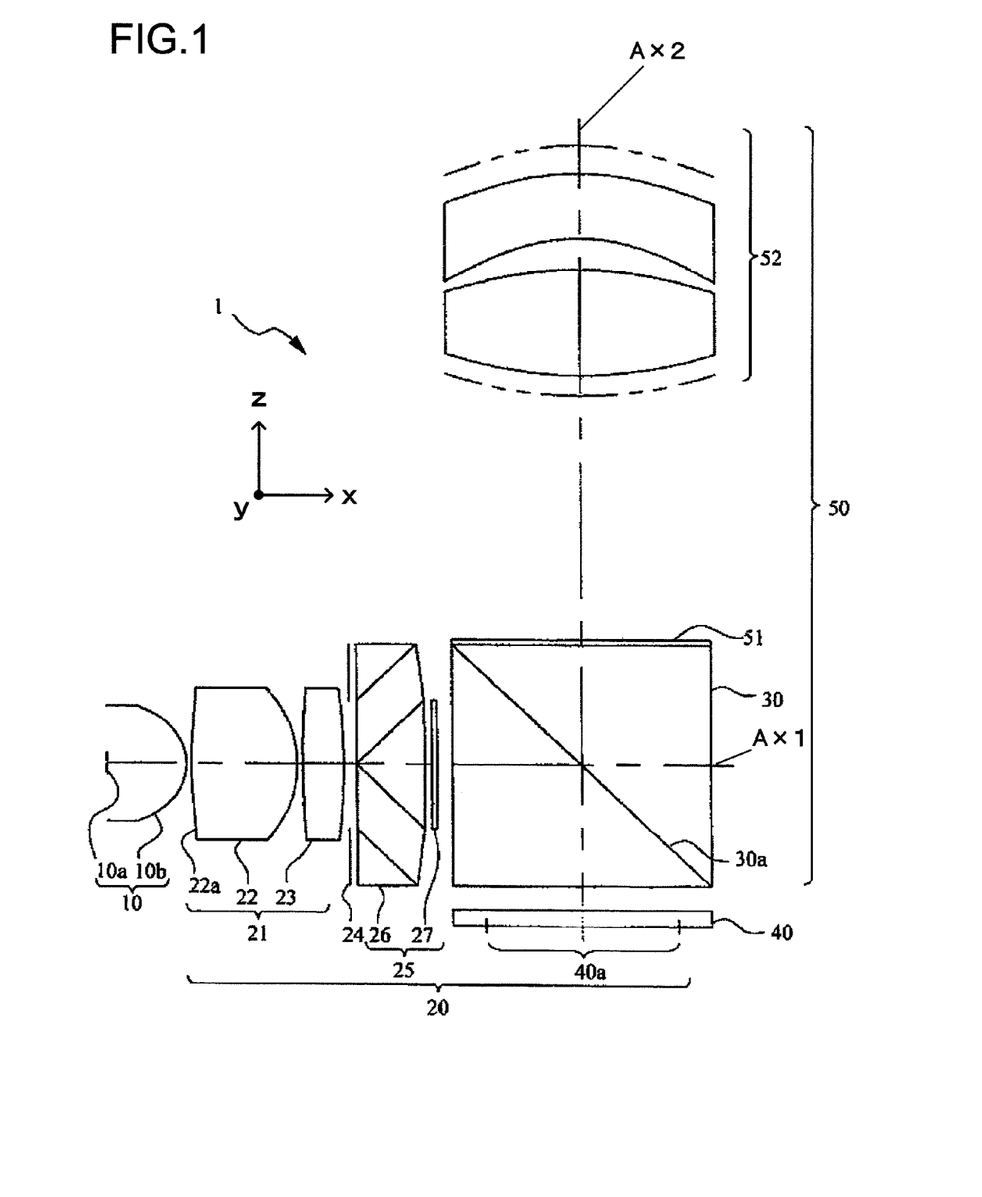
FIG. 1 is a sectional view of the illuminating optical system in a projector device achieved in a first embodiment, taken of an x-y plane.

The following is a description of an embodiment of the present invention, given in reference to drawings. It is to be noted that the drawings to be referred to in the following description each include arrows indicating an x-axis, a y-axis and a z-axis which are to be used as a universal reference. FIG. 1 shows the illuminating optical system in a projector device achieved in the first embodiment in a sectional view taken of an x-y plane. A projector device 1 includes a light source 10, an illuminating optical system 20, a display element 40 and a projection optical system 50. The light source 10, constituted with a high-luminance LED or the like, emits illuminating light. The illuminating optical system 20 radiates the illuminating light output from the light source 10 toward the display element 40, which is a reflection-type display element such as an LCOS (a reflective liquid crystal display panel manufactured by forming a liquid crystal over a silicon substrate). An image formed with light reflected at the display element 40 is enlarged and projected via the projection optical system 50 as a real image onto an imaging surface (such as a screen).

The illuminating optical system 20 is comprised with a condenser lens group 21, an aperture 24, a polarization conversion element 25 and a polarization beam splitter 30. These components are disposed one after another in the order in which they are listed above on an optical axis Ax1, starting on the side where the light source 10 is present. The condenser lens group 21 includes a first condenser lens 22 and a second condenser lens 23, whereas the polarization conversion element 25 includes a polarization splitter element 26 and a half wave plate 27. The polarization beam splitter 30 includes a polarization splitter surface 30a that allows most of the p-polarized light component to be transmitted through and reflects most of the s-polarized light component.

The projection optical system 50 is configured with the polarization beam splitter 30, a polarizing plate 51 and a projection lens group 52. These components are disposed one after another in the order in which they are listed above on an optical axis Ax2, starting on the side where the display element 40 is present. It is to be noted that the polarization beam splitter 30 is shared by the projection optical system 50 and the illuminating optical system 20. The projection lens group 52 is made up with at least one lens. The light source 10 is configured with a light emitting portion 10a and a cover 10b. The light emitting portion 10a, which emits illuminating light, is shielded with the cover 10b for protection. The light emitting portion 10a in the embodiment is an LED chip with a specific pattern formed on a light emitting surface. This LED chip is a white-light emitting diode that emits white light. The cover 10b is constituted of a transparent material (such as a resin) through which the illuminating light emitted from the light emitting portion 10a is transmitted. The display element 40 is disposed along the surface of the polarization beam splitter 30 irradiated with the part of the illuminating light from the light source 10, which is reflected at the polarization splitter surface 30a, among the plurality of outer surfaces of the polarization beam splitter 30.

The illuminating light emitted from the light emitting portion 10a of the light source 10 in the projector device 1 structured as described above is condensed at the condenser lens group 21, thus becomes a substantially parallel light flux and then enters the polarization conversion element 25 through an opening of the aperture 24. Most of the light having entered the polarization conversion element 25 is converted to light constituted with s-polarized light and the light resulting from the conversion then enters the polarization beam splitter 30. The light resulting from the conversion, which is constituted with the s-polarized light component, is reflected at the polarization splitter surface 30a of the polarization beam splitter 30 and is radiated onto the display surface of the display element 40.

The display element 40 in the embodiment is a liquid crystal panel (LCOS) with a liquid crystal instilled between a silicon substrate and a glass substrate, and switching elements such as TFTs and electrodes are disposed on the silicon substrate each in correspondence to a sub-pixel of a picture element. An aluminum layer that reflects light is formed on the outermost surface of the silicon substrate. At the display element 40, a video image can be displayed by electrically driving the liquid crystal layer present between the silicon substrate and the glass substrate where transparent electrodes are formed. Based upon the level of a video signal input to the display element 40 from a drive circuit (not shown), the voltage application to the electrodes disposed at the various pixels in the display element 40 is controlled. As a voltage is applied to each electrode at the display element 40 in correspondence to the video signal level, the positional arrangement of the liquid crystal molecules in the liquid crystal layer is altered and thus, the liquid crystal layer is caused to function as a phase plate. As a result, a video image pattern corresponding to the state of voltage application is formed at the display element 40, thereby achieving spatial light modulation.

The light constituted with the s-polarized light component, having entered through the side of the display element 40 where the glass substrate is present, is reflected at the reflecting surface (aluminum layer) located on the side where the silicon substrate is present and exits the display element 40 through the glass substrate. At the display element 40, light constituted with the s-polarized light component having entered a white pixel area undergoes modulation (polarization conversion) and becomes light constituted with the p-polarized light component with its polarization direction rotated by 90°. However, the light constituted with the s-polarized light component having entered a black pixel area retains its polarization state and exits the display element 40 as s-polarized light. It is to be noted that a color image can be displayed at the display element 40 constituted with an LCOS equipped with color filters and thus capable of color display.

The light reflected at the display element 40 reenters the polarization beam splitter 30. At this time, most of the s-polarized light component having been transmitted through the black pixel area at the display element 40 is reflected at the polarization splitter surface 30*a* and travels back toward the light source 10. The light having been modulated in the white pixel area and having departed the display element 40 as p-polarized light, on the other hand, is first transmitted through the polarization splitter surface 30*a*, transmitted through the polarizing plate 51 and then projected onto a screen (not shown) via the projection lens group 52. As a result, the image displayed at the display element 40 is projected as an enlarged image onto the screen. It is to be noted that the s-polarized light component, having been transmitted through the black pixel area, which has been transmitted through the polarization splitter surface 30*a* of the polarization beam splitter 30 instead of being reflected at the polarization splitter surface 30*a*, is removed at the polarizing plate 51 disposed on the side where the exit surface of the polarization beam splitter 30 is located. Via the polarizing plate 51, the s-polarized light component, which is not needed for image projection, is removed and, as a result, the contrast ratio of the projected image can be increased.

Figure 2:
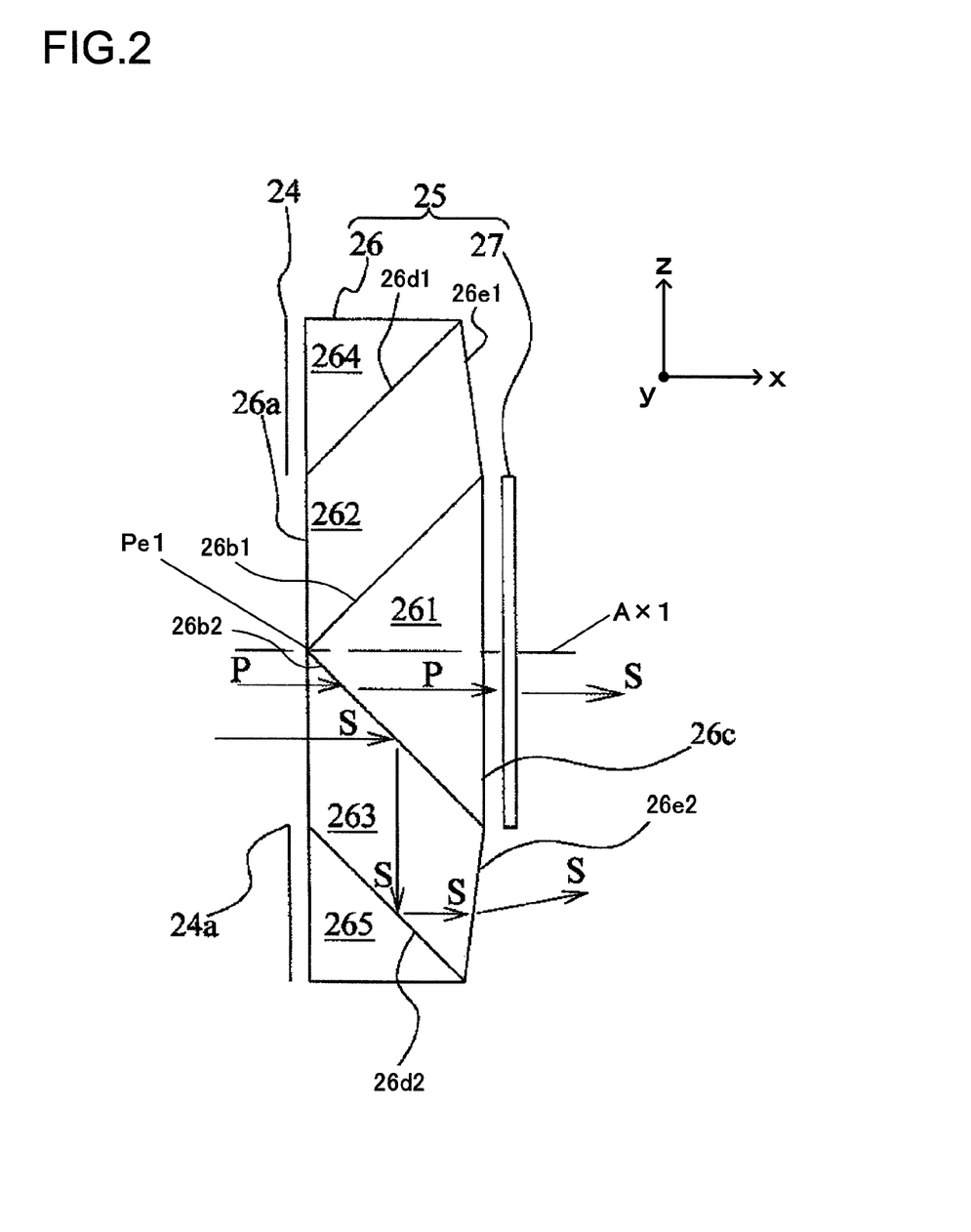
FIG. 2 shows the structure of the polarization conversion element achieved in the first embodiment in a sectional view.
Figure 3A:
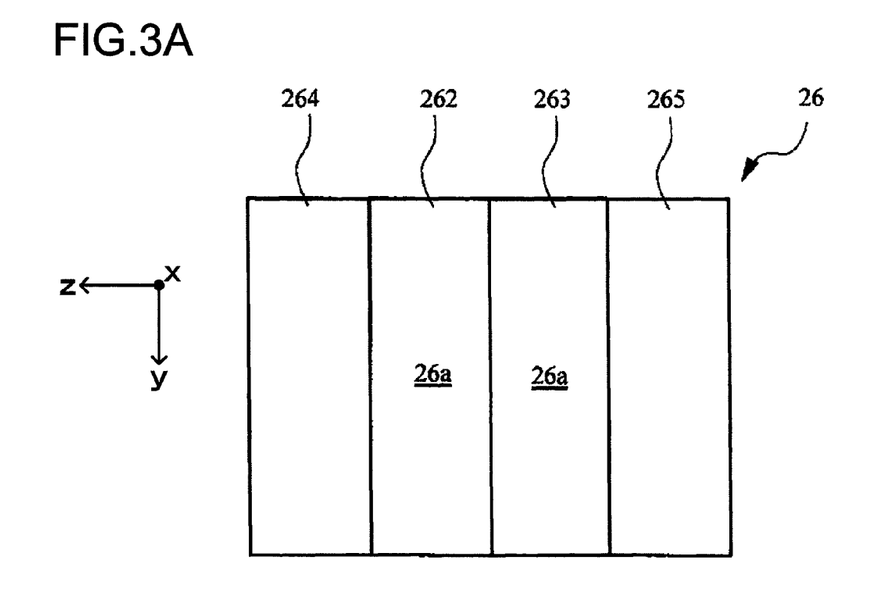
Figure 3B:
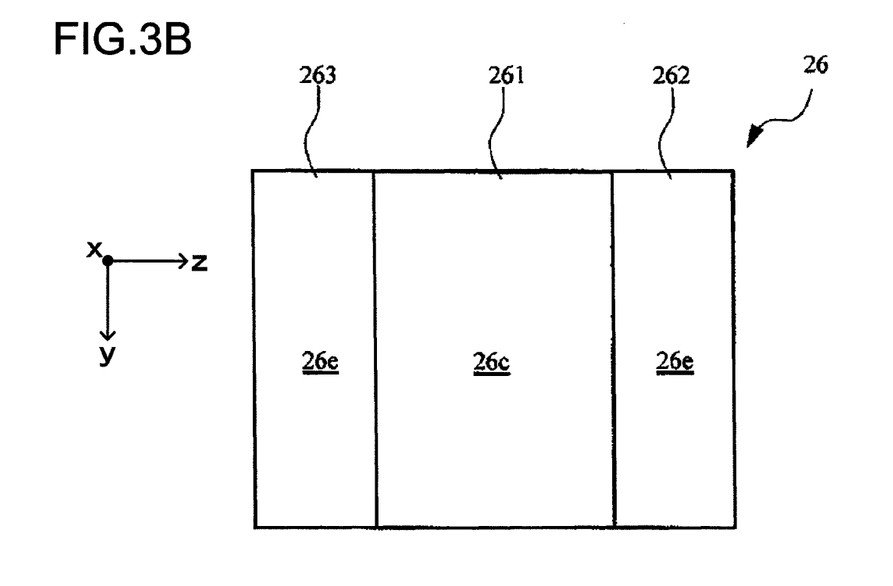

Next, in reference to FIGS. 2, 3A and 3B, the polarization conversion element 25 achieved in the first embodiment, which is included in the illuminating optical system 20 of the projector device 1 described above, is explained. The polarization conversion element 25 is configured with the polarization splitter element 26 and the half wave plate 27 as has been described earlier.

The polarization splitter element 26 is configured with a first prism 261, a second prism 262, a third prism 263, a fourth prism 264 and a fifth prism 265. The first prism 261 is formed so that its section over the x-z plane substantially achieves the shape of a right angle isosceles triangle with a right angle apex vertex Pe. The vertex Pe of the first prism 261 is set on the optical axis Ax1 at a position further toward the light source 10, whereas the surface of the first prism 261 (a first exit surface 26*c*) that forms a side facing opposite the vertex Pe is positioned toward the display element 40. The second prism 262 and the third prism 263 are each formed so as to achieve a substantially trapezoidal section over the x-z plane, and they are each bonded onto one of the two surfaces (first polarization splitter surfaces 26*b*1 and 26*b*2) of the first prism 261 that form the vertex Pe.

The fourth prism 264 and the fifth prism 265 are respectively bonded to the surfaces (second polarization splitter surfaces 26*d*1 and 26*d*2) of the second prism 262 and the third prism 263 that face opposite the surfaces forming the first polarization splitter surfaces 26*b*1 and 26*b*2.

It is to be noted that the surfaces of the second prism 262 and the third prism 263 located on the side closer to the light source 10 are set on a plane that ranges perpendicular to the optical axis Ax1 running through the vertex Pe of the first prism 261, and together form an entry surface 26*a*. The entry surface 26*a* ranging parallel to the first exit surface 26*c*, is formed to achieve a shape substantially identical to that of the first exit surface 26*c*. In addition, the entry surface 26*a* is set so as to substantially perfectly overlaps the first exit surface 26*c* when viewed from the side where the light source 10 is located. The surfaces of the second prism 262 and the third prism 263, located on the side closer to the display element 40, form second exit surfaces 26*e*1 and 26*e*2, which are set so as to range with a slight tilt toward the light source 10 relative to a plane extending from the first exit surface 26*c* along the z-axis. The first polarization splitter surface 26*b*1 and the second polarization splitter plane 26*d*1 form the parallel sides of the trapezoidal section of the second prism 262, whereas the first polarization splitter surface 26*b*2 and the second polarization splitter surface 26*d*2 form the parallel sides of the trapezoidal section of the third prism 263. A polarization splitter film is formed between the first prism 261 and the second prism 262 and between the first prism 261 and the third prism 263 (at the bonding surfaces where the first prism 261 is bonded with the second prism 262 and the third prism 263). A polarization splitter film is also formed between the second prism 262 and the fourth prism 264 (at the bonding surface where the second prism 262 and the fourth prism 264 are bonded) and between the third prism 263 and the fifth prism 265 (at the bonding surface where the third prism 263 and the fifth prism 265 are bonded). The first polarization splitter surfaces 26*b*1 and 26*b*2 and the second polarization splitter surfaces 26*d*1 and 26*d*2 mentioned earlier are thus formed. Such a polarization splitter film demonstrates characteristics whereby the p-polarized light component is mostly transmitted through but the s-polarized light component is mostly reflected.

The second exit surfaces 26*e*1 and 26*e*2 formed at the polarization splitter element 26 are set at the positions facing opposite the entry surface 26*a* so as to slightly slope toward the light source as they each range from the central area toward the outer side, as shown in FIG. 2. In other words, the second exit surfaces 26*e*1 and 26*e*2 are formed so as to produce positive refractive power.

The p-polarized light component in the illuminating light having entered through the entry surface 26*a* of the polarization splitter element 26 structured as described above is transmitted through the first polarization splitter surfaces 26*b*1 and 26*b*2 and exits the polarization splitter element 26 through the first exit surface 26*c*. The s-polarized light component, on the other hand, is reflected at the first polarization splitter surfaces 26*b*1 and 26*b*2 and is also reflected at the second polarization splitter surfaces 26*d*1 and 26*d*2 before exiting through the second exit surfaces 26*p*1 and 26*e*2. As explained earlier, the second exit surfaces 26*e*1 and 26*e*2 are formed so as to produce positive refractive power. This means that the illuminating light exiting through the second exit surfaces 26e1 and 26e2 (the s-polarized light component) is output diagonally toward the center (toward the optical axis Ax1) in a plan view taken over the y-z plane.

The half wave plate 27 functions as a rotating surface at which light being transmitted through is rotated by an extent equivalent to half the wavelength. The half wave plate 27, assuming a shape substantially identical to that of the first exit surface 26c of the polarization splitter element 26, is disposed substantially parallel to the first exit surface 26c. As a result, the p-polarized light component having exited through the first exit surface 26c is polarized and becomes s-polarized light component as it is rotated by half the wavelength. The light exiting the half wave plate 27 disposed as described above is light constituted with the s-polarized light component, as is the light exiting through the second exit surfaces 26e1 and 26e2. This means that the illuminating light having been transmitted through the polarization conversion element 25 will have been converted to light mostly constituted with the s-polarized light component.

It is to be noted that an opening 24a of the aperture 24 is formed in a shape substantially identical to that of the entry surface 26a of the polarization splitter element 26 so that the part of the illuminating light having been output from the light source 10 and condensed via the condenser lens group 21, which would otherwise enter the polarization splitter element 26 over areas other than the entry surface 26a, is restricted. As a result, the amount of p-polarized light component that exits on a path other than that described above is reduced, making it possible to reduce the p-polarized light component included in the illuminating light exiting the polarization conversion element 25. As a result, the contrast ratio of the image projected onto the screen is raised.

As FIGS. 1 and 2 clearly indicate, the diameter of the illuminating light flux exiting the polarization conversion element 25 (i.e., the width of the illuminating light measured along the z-axis) is greater than the diameter of the incoming light flux that enters the polarization conversion element 25. In the embodiment, the second exit surfaces 26e1 and 26e2 are formed so as to produce positive refractive power and thus, the illuminating light exiting through the second exit surfaces 26e1 and 26e2 of the polarization conversion element 25 is output at an angle inclining toward the center (toward the optical axis Ax1) in a plan view of a y-z plane. Thus, the illuminating light output through the second output surfaces 26e1 and 26e2 and radiated onto the display surface 40a of the display element 40 (i.e., the irradiation area of the illumination-target member where an image is displayed) can be directed toward a narrow area around the center. In other words, the efficiency with which the illuminating light is utilized can be improved by reducing the amount of illuminating light radiated onto areas around the periphery of the display surface 40a. More specifically, the second exit surfaces 26e1 and 26e2 are formed as surfaces located on the side facing opposite the entry surface 26a and slightly inclining from the center toward the outer side so as to produce positive refractive power at the second exit surfaces 26e1 and 26e2. In other words, since the irradiation area of the display element 40 irradiated with the illuminating light can be adjusted by controlling the degree of inclination of the second exit surfaces 26e1 and 26e2, the polarization splitter element 26 can be manufactured with ease.

The projector device 1 achieved as described above in the embodiment includes the polarization conversion element 25 constituting part of the illuminating optical system 20 so as to split the illuminating light output from the light source 10 into the s-polarized light component and the p-polarized light component. The s-polarized light component is directly output, whereas the p-polarized light component is converted to light constituted with the s-polarized light component. As a result, the amount of light that is transmitted through a polarization splitter surface 30a of the polarization beam splitter 30, and is thus never radiated onto the display element 40 is reduced so as to improve the efficiency with which the illuminating light is utilized. This, in turn, makes it possible to project a bright image even in conjunction with a relatively low-luminance light source 10, resulting in reduced power consumption. In addition, by improving the utilization efficiency with which the light output from the light source 10 is utilized, heat generation at the projector device 1 is minimized, which, in turn, allows the projector device 1 to be provided as a more compact unit. Furthermore, by producing positive refractive power at the second exit surfaces 26e1 and 26e2 of the polarization splitter element 26 constituting part of the polarization conversion element 25, the illuminating light can be accurately radiated onto the target display surface 40a at the display element 40, further improving the illuminating light utilization efficiency.

The display surface 40a of the display element 40 assumes a substantially rectangular shape. In order to radiate the illuminating light output from the light source 10 onto the display surface 40a with a high level of efficiency, the sectional shape (the shape of the outline) of the illuminating light, which is initially radiated from the light source 10 as a beam assuming a circular cone shape needs to be altered so as to achieve an outline shape substantially identical to and a size substantially equal to those of the display surface 40a of the display element 40. In other words, the shape of the outline of the illuminating light radiated from the light source 10, which normally assumes a circular shape, must be altered so as to achieve a shape substantially matching the rectangular shape of the outline of the display surface 40a of the display element 40. For this reason, the condenser lens group 21 in the projector device 1 is configured as described below.

Figure 4:
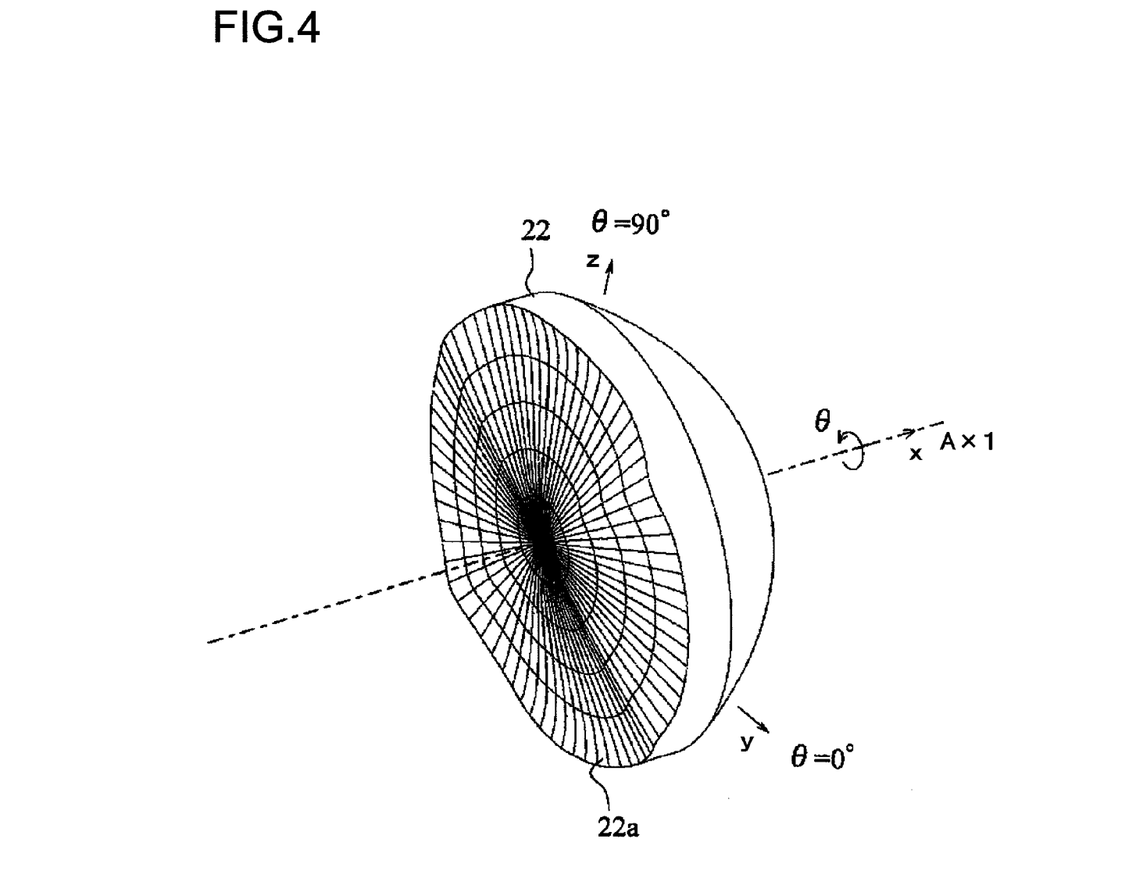
FIG. 4 shows the structure of the first condenser lens in a perspective.

As shown in FIG. 4, the surface of the condenser lens group 21 constituted with a first condenser lens 22 and the second condenser lens 23, which is located closest to the light source 10, i.e., a surface 22a of the first condenser lens 22 located toward the light source 10, is formed as a free curved surface achieving varying levels of refractive power in correspondence to the rotational angle assumed around the optical axis Ax1. In other words, the first condenser lens 22 is a condenser lens with a free curved surface. Via the free curved surface 22a, uniformity of illumination is achieved for the illuminating light output from the light source 10 and the shape of the outline of the illuminating light is altered to a rectangular shape similar to the shape of the outline of the display surface 40a at the display element 40. The condenser lens group 21 is configured so that the illuminating light having passed through the free curved surface 22a is further condensed at another lens surface in the condenser lens group 21 and is radiated as illuminating light achieving an outline shape and a size substantially matching those of the display surface 40a of the display element 40.

The free curved surface 22a is defined as described below. A virtual plane, which cuts through the optical axis Ax1 and intersects the light emitting portion 10a, the free curved surface 22a and the display surface 40a of the display element 40 is hypothesized. A free curved surface 22a, which allows illuminating light, radiated from an area of the light emitting portion 10a intersecting the virtual plane, to be condensed at the part of the free curved surface 22a intersecting the virtual plane and to illuminate the area of the display surface 40a of the display element 40 intersecting the virtual plane, is determined by taking into consideration the optical power at the other lens surface. The free curved surface 22a is defined in correspondence to each rotational angle by sequentially rotating the virtual plane around the optical axis Ax1 in steps of a predetermined angle. Assuming that the y-axis extends along the longer sides of the display surface 40a at the display element 40, that the z-axis extends along the shorter sides of the display surface 40a and that the x-axis extends along the optical axis Ax1, the rotational angle θ assumed around the optical axis Ax1 is 0° along the longer sides (along the y-axis) of the display surface 40a and is 90° along the shorter sides (along the z-axis). At the display element 40 that includes a display surface 40a achieving an aspect ratio of 4:3, the rotational angle θ of 36.87° is assumed along the diagonal of the display surface 40a.

At least one of the lens surfaces in the condenser lens group 21 can be formed as a free curved surface as described above. Any such free curved surface should be formed so that the shape of the outline of the illuminating light, which is initially radiated from the light source 10 as light assuming a circular cone shape, is altered to a rectangular shape substantially identical to that of the display surface 40a of the display element 40 and uniformity in luminance is achieved. The free curved lens surface allows more light to be utilized as illuminating light by minimizing the loss of light output from the light source 10, which, in turn, makes it possible to reduce power consumption at the light source 10 even when the luminance of the light source 10 is low. Furthermore, by reducing the extent of loss of light radiated from the light source 10, heat generated at the projector device 1 can be reduced and the projector device 1 can be provided as a more compact unit. In the condenser lens group 21, which includes the free curved surface 22a formed as described above, the illuminating light outline shape-altering function and the luminance-equalizing function, among the functions of the condenser lens group 21, are achieved at the free curved surface 22a and the condensing function is achieved at another lens surface in the condenser lens group 21. Such a free curved surface 22a can be designed with better ease with a higher level of design freedom. In addition, as the shape of the illuminating light outline is altered to a substantially rectangular shape via the condenser lens group 21, the illuminating light can be accurately radiated into the range of the entry surface 26a at the polarization conversion element 25 (polarization splitter element 26) even without the aperture 24.

Figure 5:
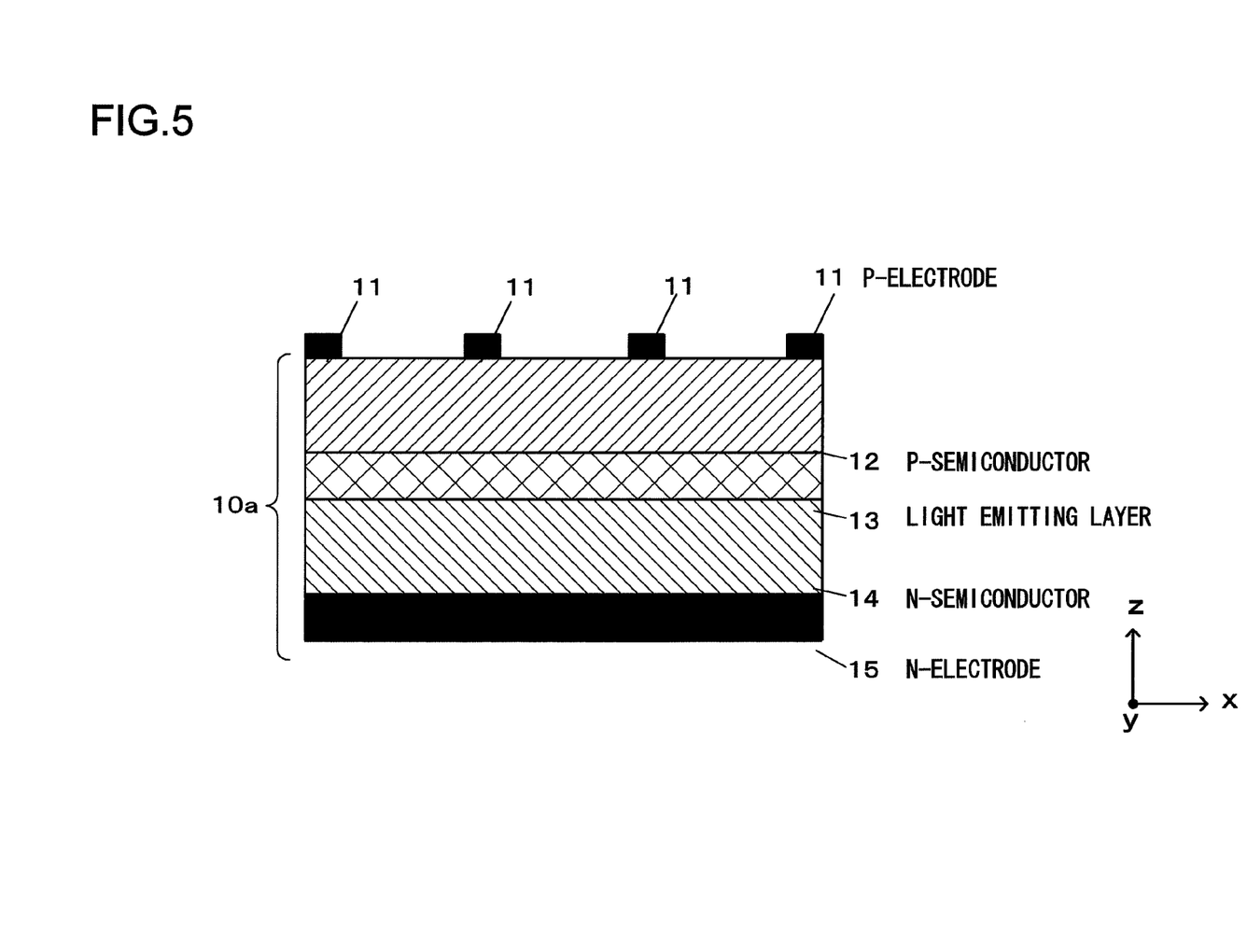
FIG. 5 is a sectional view of the light emitting portion taken of an x-z plane.

Next, the structure of the light emitting portion 10a is described in detail. FIG. 5 shows the light emitting portion 10a in a sectional view taken over the x-z plane. The light emitting portion 10a achieved in the embodiment is an LED chip that includes p-electrodes 11, a p-semiconductor 12, a light emitting layer 13, an n-semiconductor 14 and an n-electrode 15 laminated one on top of another. As a voltage is applied in the area between the p-electrodes 11 and the n-electrode 15, the light emitting layer 13 located between the p-semiconductor 12 and the n-semiconductor 14 emits light and illuminating light is radiated from the light emitting surface located on the side where the p-electrodes 11 are present.

The p-electrodes 11 are arrayed in a neat linear pattern at the surface of the p-semiconductor 12 so as to improve the light extraction efficiency and achieve uniformity in the current density. For this reason, a pattern attributable to the presence of the p-electrodes 11 is formed at the light emitting surface of the light emitting portion 10a.

Figure 6A:
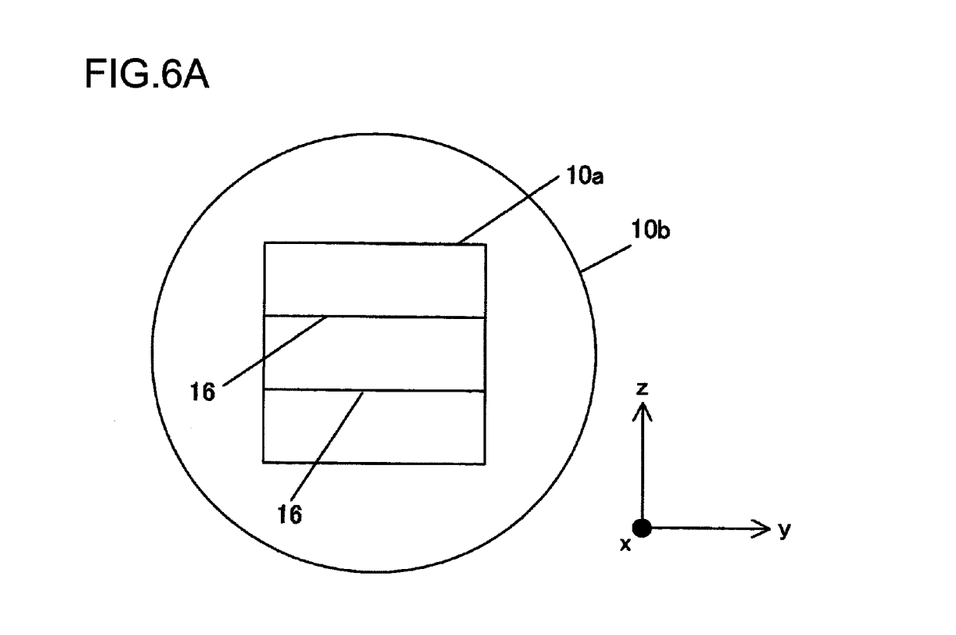

FIG. 6A shows the light source 10 viewed from the side where the illuminating light is emitted (from the side where the polarization beam splitter 30 is present). As shown in FIG. 6A, the light emitting surface of the light emitting portion 10a is formed as a substantially square shaped surface divided into three areas by two splitting lines 16 (formed with p-electrodes 11) running along the y-axis (along the front/rear direction in FIG. 1 and along the left/right direction in FIG. 6A). The split pattern at the light emitting portion 10a is formed with the three separate areas.

Figure 6B:
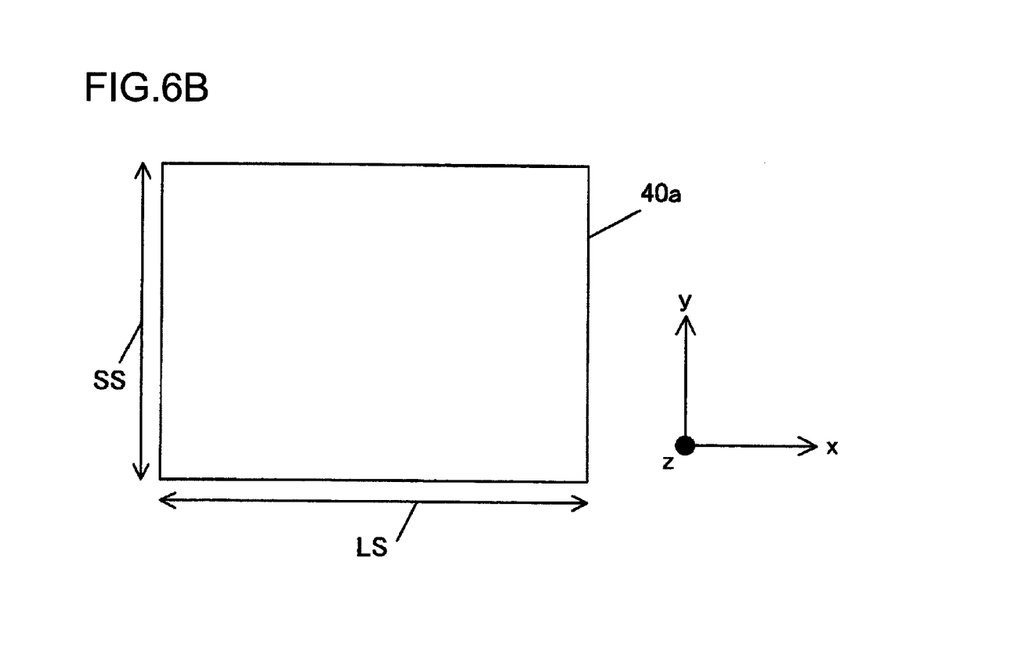

FIG. 6B shows the display element 40 viewed from the side where the display surface 40a is present (the side where the polarization beam splitter 30 is present). The display surface 40a is formed in a rectangular shape that includes a long side LS and a short side SS in the embodiment. The long side and the short side may assume lengths that achieve a ratio of, for instance, 4:3.

If any pattern is formed at the light emitting surface of the light emitting portion 10a and the pattern is projected onto the display surface 40a, uneven illumination will occur at the projection surface due to deficiency of light over the areas corresponding to the pattern. In the embodiment, the light source 10 is disposed so that the splitting lines 16, viewed at the display surface 40a, run substantially parallel to the direction along which the short side SS of the display surface 40a extends. When the light source 10 is disposed with this positional arrangement, an image of the chip pattern at the LED chip is not readily formed at the display surface 40a for the following reason.

Figure 7:
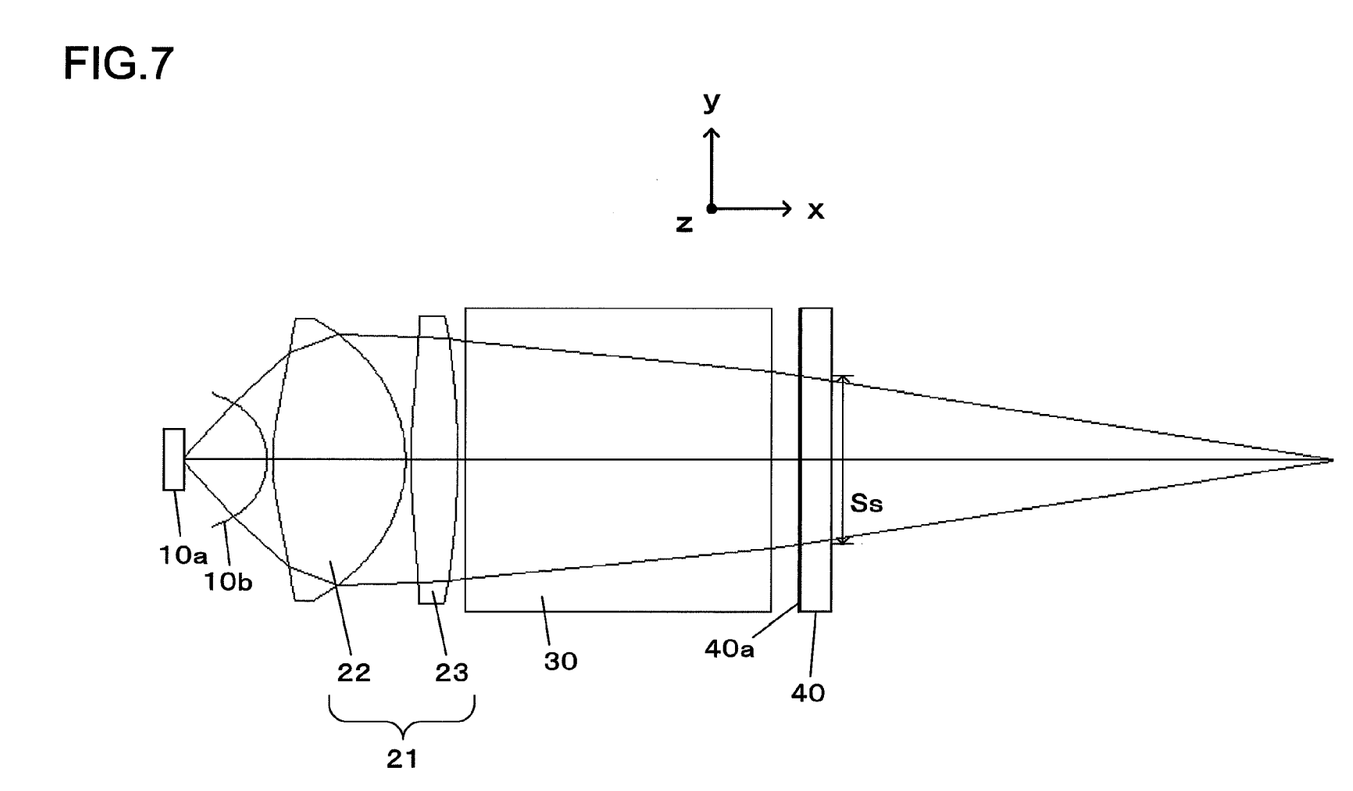
FIG. 7 shows the optical path through which the illuminating light from the light source travels in a sectional view taken of an x-y plane.
Figure 8:
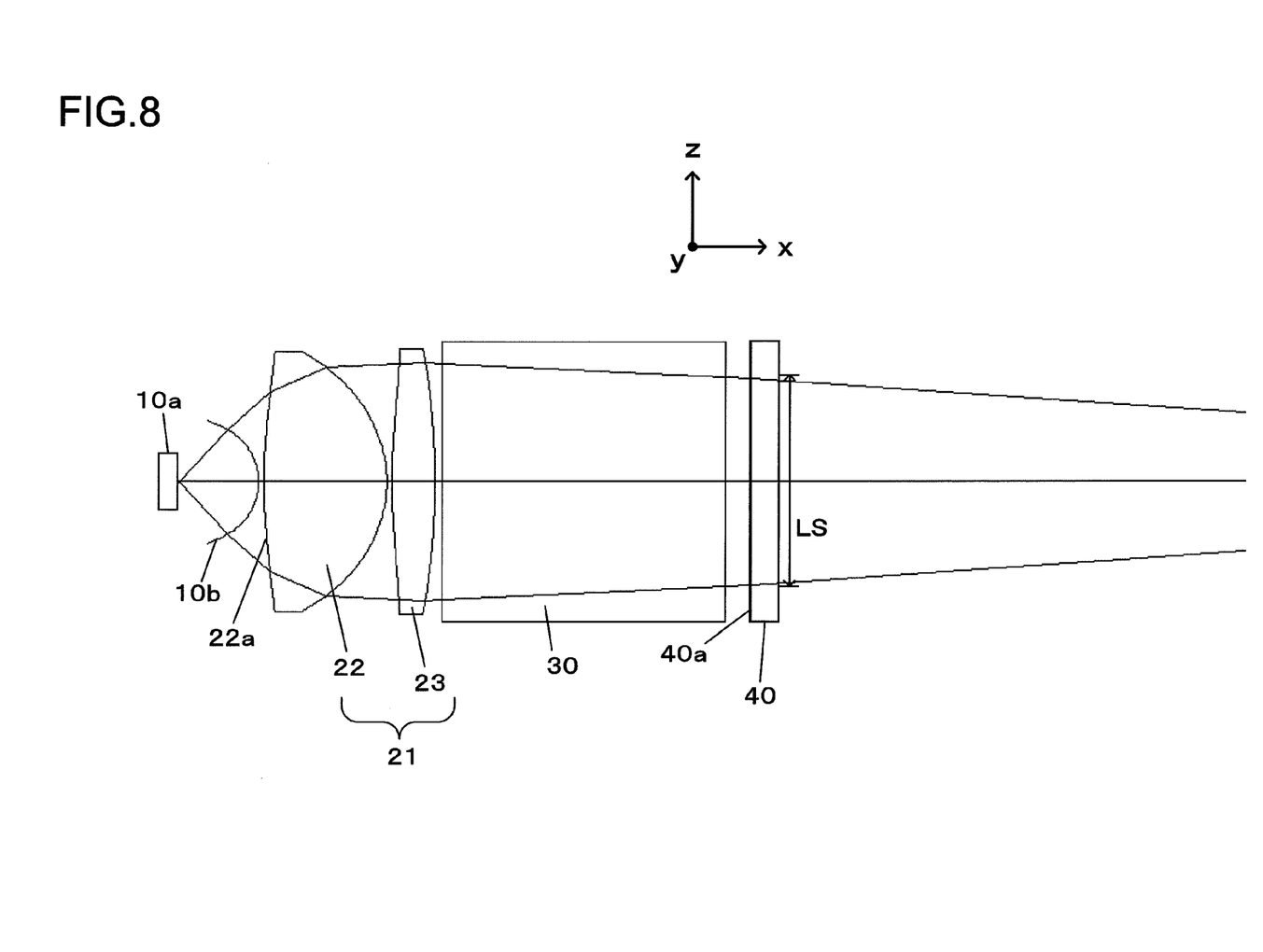
FIG. 8 shows the optical path through which the illuminating light from the light source travels in a sectional view taken of an x-z plane.

FIGS. 7 and 8 each show, in a sectional view, the optical path through which the illuminating light from the light source 10 travels. FIG. 7 is a sectional view taken over the x-y plane, whereas FIG. 8 is a sectional view taken over the x-z plane. It is to be noted that for purposes of simplification, neither FIG. 7 nor FIG. 8 includes an illustration of the polarization splitter surface 30a at the polarization beam splitter 30.

As explained earlier, the outline of the illuminating light radiated as a beam assuming a circular cone shape from the square light emitting portion 10a is altered at the condenser lens group 21 so as to achieve an outline shape and a size substantially matching that of the display surface 40a. Since the light emitting portion 10a is smaller than the display surface 40a, the split pattern formed at the light emitting surface is enlarged when projected onto the display surface 40a. At the same time, since the display surface 40a has a rectangular shape, the split pattern at the light emitting surface is enlarged at different magnification factors along the short side SS and the long side LS, as shown in FIGS. 7 and 8.

As FIGS. 7 and 8 clearly indicate, the image formation position at which the image of the split pattern at the light emitting surface is formed along the short side SS is closer to the display surface 40a. In other words, a clearer image of the light emitting surface split pattern is formed along the short side SS rather than along the long side LS. In the embodiment, the light source 10 is disposed so that the direction along which the splitting lines 16 extend (along the y-axis) as viewed at the display surface is set substantially parallel to the short side SS of 40a at the display surface 40a. By assuming such a positional arrangement in conjunction with the various members, it is ensured that an image of the splitting lines 16 is not readily formed at the display surface 40a and, as a result, uneven illumination does not occur readily at the display surface 40a.

The projector device in the first embodiment described above achieves the following advantages.

(1) The projector device 1 includes the illuminating optical system 20, which radiates light toward the display element 40 with the rectangular display surface 40a that ranges along the long side LS and along the short side SS. The illuminating optical system 20 includes the square light emitting portion 10a with the light emitting surface thereof split into three separate areas with splitting lines running along the y-axis and the condenser lens group 21 via which the light from the light emitting surface is condensed and is radiated toward the display surface 40a. The condenser lens group 21 condenses the light from the light emitting surface so that the shape of the outline of the area irradiated with the light achieves a substantially rectangular shape by assuming varying image formation positions of the light emitting surface along the long side LS and along the short side SS at the display surface 40a. The light emitting portion 10a is disposed so that the y-axis runs substantially parallel to the short side SS at the display surface 40a. As a result, any uneven illumination attributable to the formation of an image of the light emitting surface split pattern at the illumination-target member can be prevented.

(2) The condenser lens group 21 condenses the light from the light emitting portion 10a so as to assume a smaller length along the direction corresponding to the short side SS of the display surface 40a compared to the length assumed along the direction corresponding to the long side LS of the display surface 40a. Through these measures, formation of a clear image of the split pattern at the display surface 40a is prevented.

(3) The condenser lens group 21 includes a lens with a free curved surface so as to condense the light from the light emitting portion 10a to achieve an outline shape substantially matching the shape of the display surface 40a. As a result, the light originating from the light source 10 can be utilized with a high level of efficiency.

(4) The polarization conversion element 25, which aligns the directions along which light to be radiated toward the display element 40 is polarized, is disposed between the condenser lens group 21 and the display element 40. In addition, the second exit surfaces 26e1 and 26e2 of the polarization splitter element 26 disposed between the condenser lens group 21 and the display element 40 produce positive refractive power. Through these measures, the utilization efficiency with which the light from the light source 10 is utilized is improved.

(Second Embodiment)

Figure 9:
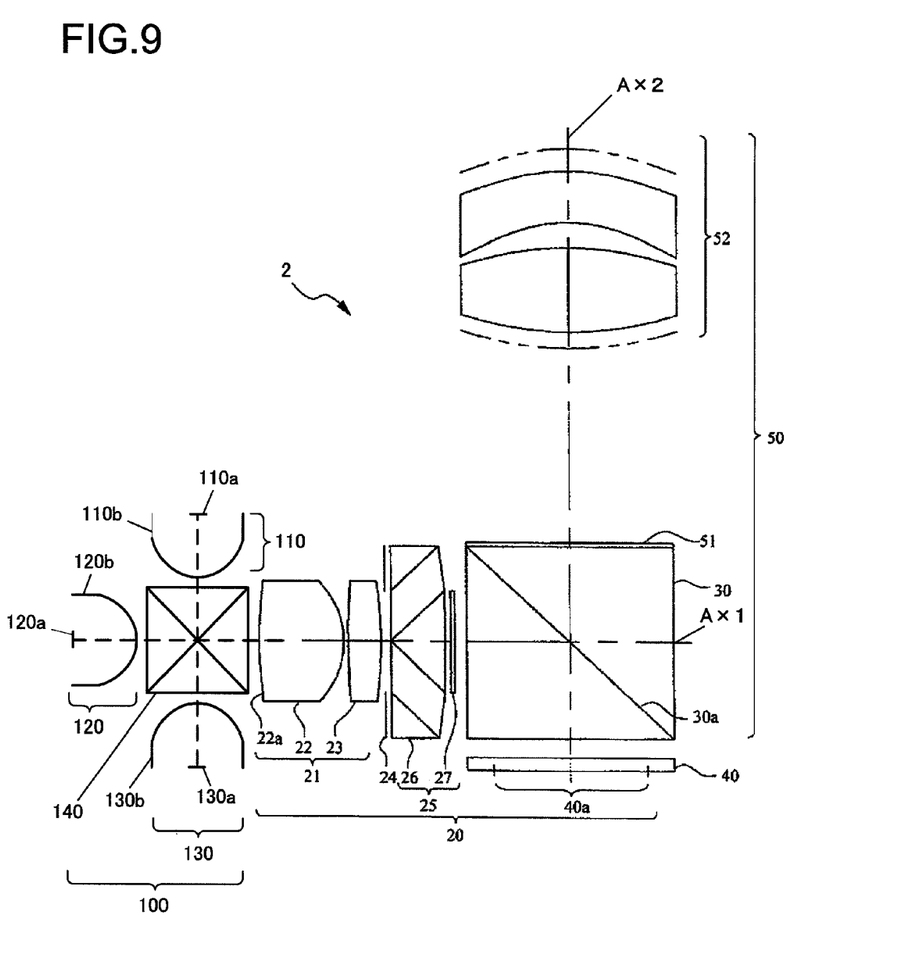
FIG. 9 is a sectional view of the illuminating optical system in a projector device achieved in a second embodiment, taken of an x-y plane.

FIG. 9 shows the illuminating optical system of a projector device achieved in the second embodiment of the present invention in a sectional view of an x-y plane. It is to be noted that in the following description, members fulfilling functions equivalent to those in the projector device 1 achieved in the first embodiment are notated with the same reference numerals as those in the first embodiment so as to preclude the necessity for a repeated explanation thereof.

The projector device 2 in this embodiment includes a light source 100 shown in FIG. 9, instead of the light source 10 shown in FIG. 1. The light source 100 is configured with a red-color LED 110 that emits red light, a green-color LED 120 that emits green light, a blue-color LED 130 that emits blue light and a cross dichroic prism 140 that combines the light in the three colors. As is the light source 10 in the first embodiment, the red-color LED 110 is constituted with a light emitting portion 110a and a cover 110b, with a pattern similar to that at the light emitting portion 10a formed at the light emitting surface of the light emitting portion 110a. The green-color LED 120 and the blue-color LED 130 adopt similar structures.

The various LEDs are disposed so that the direction along which the splitting lines formed at the light emitting surfaces of the light emitting portions 110a, 120a and 130a extend is set substantially parallel to the short side SS of the display surface 40a. Namely, the splitting lines at the light emitting surface of the light emitting portion 110a extend along the x-axis, the splitting lines at the light emitting surface of the light emitting portion 120a extend along the y-axis and the splitting lines at the light emitting surface of the light emitting portion 130a extend along the x-axis.

The second embodiment, adopted in conjunction with a light source that outputs light generated by combining light emitted from three different color LEDs, achieves advantages similar to those of the first embodiment.

(Third Embodiment)

Figure 10:
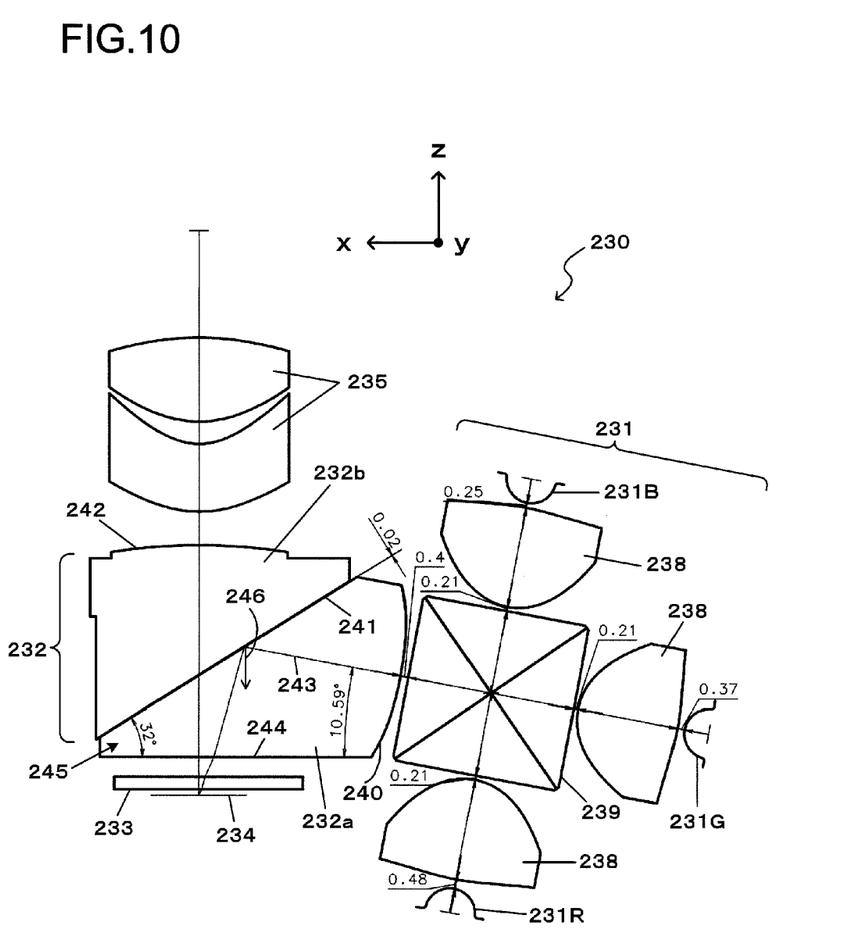
FIG. 10 is a sectional view of the illuminating optical system in a projector device achieved in a third embodiment, taken of an x-y plane.

FIG. 10 shows the illuminating optical system of a projector device achieved in the third embodiment of the present invention in a sectional view taken of an x-y plane. An illuminating optical system 230 of the projector device achieved in the embodiment includes a light source unit 231 that emits light in various colors, i.e., red light, green light and blue light, through time division, a total reflection prism 232, a protective member 233, a micro-mirror device 234 and a projection lens 235.

The light source unit 231 includes three high-luminance LEDs 231R, 231G and 231B which are turned on in time series, condenser lenses 238, each of which condenses light fluxes emitted from one of the high-luminance LEDs and outputs the condensed light fluxes as a substantially parallel light flux and a cross-dichroic prism 239 that directs the substantially parallel light flux toward the total reflection prism 232. The high-luminance LED 231R is a red-color LED that emits red light. While it is desirable to collimate the various light fluxes so as to achieve a completely parallel light flux, the term "substantially parallel light flux" is used above by taking into consideration possible manufacturing error. In addition, the high-luminance LED 231 G is a green-color LED, the high-luminance LED 231B is a blue-color LED and they respectively emit green light and blue light. The light fluxes emitted from the individual high-luminance LEDs are condensed at the respective condenser lenses 238 each disposed frontward relative to one of the high-luminance LEDs and are output as substantially parallel light fluxes. The substantially parallel light fluxes thus output constitute a light flux that is radiated onto the micro-mirror device 234 as will be explained later.

It is to be noted that the distances between the three high-luminance LEDs 231R, 231G and 231B and the corresponding condenser lenses 238 are not uniform, with the high-luminance LED 231R and the corresponding condenser lens 238 set apart from each other by 0.48 mm, the high-luminance LED 231G and the corresponding condenser lens 238 set apart from each other by 0.37 mm and the high-luminance LED 231B and the corresponding condenser lens 238 set apart from each other by 0.25 mm, as shown in FIG. 10. Such variance in the distance is assumed in order to ensure that no axial chromatic aberration occurs when light fluxes in the three different colors, i.e., red, blue and green, originating from the individual high-luminance LEDs are projected.

The substantially parallel light fluxes in the three different colors departing the individual condenser lenses 238 are combined through time division at the cross-dichroic prism 239 and the resulting combined light flux is output from the cross-dichroic prism 239 toward the total reflection prism 232. The total reflection prism 232 is formed by pasting a first prism 232a and a second prism 232b together over a 0.02 mm gap. The presence of such a gap makes it possible to form a total reflection surface 241, which is to be described later. A surface 240 of the first prism 232a, located closer to the light source unit 231, via which the substantially parallel light fluxes output from the light source unit 231 enters, is a free curved surface. At the free curved surface 40, the substantially parallel light fluxes are condensed so that the circular section of the irradiation area of light output from the light source unit 213 is altered to achieve a rectangular shape so substantially match the outline shape of the display area of the micro-mirror device 234. A surface 242 of the second prism 232b, located toward the projection lens 235, is an aspherical surface via which any aberration manifesting in the light reflected from the micro-mirror device 234 is corrected as the reflected light from the micro-mirror device 234 exits the surface 242 of the second prism 232b.

The protective member 233 is a transparent member that protects the display surface of the micro-mirror device 234. The micro-mirror device 234 is a reflection-type display element that includes micro-mirrors arrayed in a two-dimensional pattern. It is to be noted that the first prism 232a and the second prism 232b in the embodiment are each constituted of a resin (e.g., cyclo-olefin polymer) or a glass material with a refractive index of approximately 1.5309. In addition, the cross-dichroic prism 239 is constituted of a resin or a glass member with a refractive index of approximately 1.5187, the protective member 233 is constituted of a resin or a glass member with a refractive index of approximately 1.52 and the condenser lenses 238 are constituted of a resin or a glass member with a refractive index of approximately 1.6231. In addition, the tilt angle of the reflecting surface of each of the mirrors constituting the micro-mirror device 234 can be adjusted to +12° or −12°.

Next, the operation of the illuminating optical system 230 configured as described above is explained. As the high-luminance LEDs 231R, 231G and 231B are sequentially turned on in the projector device, light fluxes emitted from each of the high-luminance LEDs are collimated via the corresponding condenser lens 238 and thus enter the cross dichroic prism 239 as a substantially parallel light flux.

The combined light flux achieved by combining the three substantially parallel light fluxes from the three condenser lenses 238 departs the cross-dichroic prism 239 toward the surface 240 of the first prism 232a. This combined light flux, which is also a substantially parallel light flux, enters the total reflection prism 232 via the free curved surface 240, is totally reflected at the total reflection surface 241 and departs the total reflection prism 232 through a surface 244 before it enters the display surface (display area) of the micro-mirror device 234 via the protective member 33. In other words, the combined light flux having departed the cross-dichroic prism 239 is guided via the total reflection prism 232 toward the display area of the micro-mirror device 234 as the combined light flux is totally reflected at the total reflection surface 241 of the total reflection prism 232. The combined light flux guided to the display area of the micro-mirror device 234 enters the display area, light reflected from the display area enters the total reflection prism 232 through the surface 244 and the light having entered the total reflection prism 232 is transmitted through the total reflection surface 241 before exiting the total reflection prism 232 through the aspherical surface 242. Subsequently, the reflected light the projection lens 235 is projected onto a projection surface outside the camera. The total reflection surface 241 is the surface of the first prism 232a facing the 0.02 mm gap present between the first prism 232a and the second prism 232b as explained earlier.

The light source unit 231 in the embodiment is configured as follows so that the projector device must be provided as a compact unit. An exiting light axis 243 in FIG. 10 is the optical axis of the combined light flux output through the cross-dichroic prism 239. The light source unit 231 in the embodiment is disposed so that the exiting light axis 243 tilts at a predetermined angle along the direction indicated by an arrow 246 in FIG. 10 relative to the entry surface (surface 244) of the micro-mirror device 234. While it is desirable that the predetermined angle be approximately 10.59° as indicated in FIG. 10, it may be any angle within the range of 10° through 11° in consideration of possible manufacturing error.

When the exiting light axis 243 of the light exiting the light source unit 231 is tilted as described above, a smaller apex angle 245 is formed by the exit surface (surface 244), through which the light flux having been totally reflected at the total reflection surface 241 exits, and the total reflection surface 241, compared to the apex angle formed by the same surfaces when the exiting light axis 243 extends parallel to the entry surface (surface 244) of the micro-mirror device 234. As a result, the distance between the surface 244 and the surface 242 can be reduced. Namely, the tilt of the exiting light axis 243 relative to the entry surface (surface 244) of the micro-mirror device 234 allows the total reflection prism 232 to assume a smaller size compared to that required when the exiting light axis 243 runs parallel to the entry surface (surface 244) of the micro-mirror device 234. While it is desirable that the apex angle be approximately 32°, as indicated in FIG. 10, it may be any angle within the range of 31.5° through 32.5° in view of possible manufacturing error.

The outline of the display area at the micro-mirror device 234 in the embodiment assumes a substantially rectangular shape similar to that of the display surface 40a of the display element 40 in the first embodiment shown in FIG. 6B, with its longer sides extending along a direction parallel to the drawing paper surface (along the x-axis) and its shorter sides extending forward/backward relative to the drawing paper surface (along the y-axis). The surface 240 of the first prism 232a located closer to the light source unit 231 is a free curved surface where the substantially parallel light flux output from the light source unit 231 is condensed so as to achieve an outline shape substantially matching the shape of the outline of the display area at the micro-mirror device 234.

In addition, the high-luminance LEDs 231R, 231G and 231B are similar to the red-color LED 110, the green-color LED 120 and the blue-color LED 130 respectively in the second embodiment, in that the pattern shown in FIG. 6A is formed at their light emitting surfaces. The various LEDs are disposed so that the direction along which the splitting lines formed at the light emitting surfaces extend is set substantially parallel to the direction along which the short sides of the display area at the micro-mirror device 234 extend. Namely, the splitting lines at the light emitting surface of the high-luminance LED 231R extend along the x-axis, the splitting lines at the light emitting surface of the high-luminance LED 231G extend along the y-axis and the splitting lines at the light emitting surface of the light emitting surface of the high-luminance LED 231B extend along the x-axis.

Advantages similar to those of the second embodiment are achieved through the third embodiment.

Variations such as those described below are also within the scope of the present invention and one of the variations or a plurality of variations may be adopted in combination with any of the embodiments described above.

(Variation 1)

While the display surface 40a of the display element 40 assumes a rectangular shape with an aspect ratio of 4:3 in the embodiments described above, the display surface 40a may have a different aspect ratio. More specifically, the display surface 40a may be any rectangular shape having longer sides and shorter sides.

(Variation 2)

The present invention may be adopted in conjunction with a display element 40 other than a reflective liquid crystal element LCOS (liquid crystal on silicon). For instance, it may be adopted in conjunction with a DMD (digital mirror device) which is a reflection-type display element or an LCD (liquid crystal display) which is a transmissive liquid crystal element.

(Variation 3)

The light emitting surface of the light emitting portion 10a does not need to be square shaped, as has been described in reference to the embodiments as long as it is rectangular. In addition, the light emitting surface may be divided with splitting lines into any number of separate areas.

(Variation 4)

The present invention may be adopted in conjunction with a single condenser lens instead of the condenser lens group 21. In addition, it is not necessary that the condenser lens group 21, via which the light from the light source is condensed, include a lens with a free curved surface so as to achieve an outline shape for the light substantially identical to that of the display surface 40a. In other words, the condenser lens group 21 simply needs to condense the light from the light emitting surface so that the outline of the area irradiated with the light forms a substantially rectangular shape by assuming different image formation positions of the light emitting surface along the longer sides and along the shorter sides. For instance, the condenser lens group may include a cylindrical lens or an anamorphic lens that condenses the light from the light emitting surface so that the outline of the area irradiated with the light forms an elliptical shape that contains the display surface 40a. In conjunction with such a lens, different image formation positions of the light emitting surface can be assumed along the longer sides and the shorter sides of the display surface 40a and thus, advantages similar to those achieved in conjunction with a lens having a free curved surface can be achieved.

(Variation 5)

While the illuminating optical system according to the present invention constitutes part of a projector device in the embodiments described above, the present invention may be adopted in an illuminating optical system in a device other than a projector device. For instance, advantages similar to those of the embodiments described above may be achieved by adopting the present invention in an illuminating optical system used in a microscope to radiate light onto a test-piece.

(Variation 6)

While the illuminating light output from the light source 10 is converted to s-polarized component light via the polarization conversion element 25 in the embodiments described above, the illuminating light may instead be converted to p-polarized light component.

(Variation 7)

The illuminating light from the light source does not need to be white light. For instance, the present invention may be adopted in conjunction with a light source constituted with a red-color LED that emits red light alone. In addition, a member other than an LED may be utilized as a light source as long as it includes a light emitting surface divided into a plurality of areas with splitting lines running along a specific direction.

As long as the features characterizing the present invention are not compromised, the present invention is not limited to the particulars of the embodiments described above and other modes that are conceivable within the technical scope of the present invention are also within the scope of invention.

What is claimed is:

1. An illuminating optical system, comprising:
   a substantially rectangular-shaped light source that includes a light emitting surface with a split pattern formed therein by a splitting line, the splitting line extending along a predetermined direction and splitting the light emitting surface into a plurality of separate areas;
   an illumination-target member that includes a rectangular radiation-target area ranging along a lengthwise direction in which longer sides thereof extend and along a crosswise direction in which shorter sides thereof extend; and
   an optical member that condenses light departing the light emitting surface and radiates the condensed light toward the radiation-target area by assuming different image formation positions of the light emitting surface along the longer sides and along the shorter sides of the radiation-target area so as to enlarge the split pattern at different magnification factor along the longer sides and the shorter sides, wherein:
   the light source is disposed so that the shorter sides of the radiation-target area are set substantially parallel to the predetermined direction, so as to reduce an extent of uneven illumination attributable to an image of the split pattern at the light emitting surface of the light source formed at the illumination-target member.

2. An illuminating optical system that radiates light toward an illumination-target member that includes a rectangular radiation-target area ranging along a lengthwise direction in which longer sides thereof extend and along a crosswise direction in which shorter sides thereof extend, comprising:
   a substantially rectangular-shaped light source that includes a light emitting surface divided into a plurality of areas separated from one another with a splitting line extending along a predetermined direction; and
   an optical member that condenses light departing the light emitting surface and radiates the condensed light toward the radiation-target area, wherein:
   the optical member condenses the light from the light emitting surface so that an outline of an area irradiated with the light from the light emitting surface achieves a substantially rectangular shape by assuming different image formation positions of the light emitting surface along the longer sides and along the shorter sides of the radiation-target area; and
   the light source is disposed so that the shorter sides of the radiation-target area are set substantially parallel to the predetermined direction at the radiation-target area.

3. An illuminating optical system according to claim 2, wherein:
   the optical member is constituted with a condenser lens.

4. An illuminating optical system according to claim 3, wherein:
   an outline of the radiation-target area forms a shape that ranges along a direction corresponding to the crosswise direction over a length smaller than a length over which the shape ranges along a direction corresponding to the lengthwise direction.

5. An illuminating optical system according to claim 3, wherein:
   the condenser lens includes at least one of; a lens with a free curved surface that condenses light so that the outline of the area irradiated with the light achieves a shape substantially identical to the shape of the radiation-target area, a cylindrical lens that condenses light so that the outline of the area irradiated with the light achieves an elliptical shape that contains the radiation-target area and an anamorphic lens that condenses light so that the outline of the area irradiated with the light achieves an elliptical shape containing the radiation-target area.

6. An illuminating optical system according to claim 3, wherein:
the light source includes a light emitting diode.

7. An illuminating optical system according to claim 6, wherein:
the light emitting diode in the light source includes at least one of; a white light emitting diode, a red color light emitting diode, a green color light emitting diode and a blue color light emitting diode.

8. An illuminating optical system according to claim 3, further comprising:
a polarization conversion element disposed between the condenser lens and the illumination-target member, which aligns directions along which light to be radiated onto the illumination-target member is polarized, wherein:
a positive refractive power is achieved at, at least, one of optical surfaces of an optical member disposed between the condenser lens and the illumination-target member.

9. A projector device equipped with an illuminating optical system according to claim 1.

10. A projector device according to claim 9, wherein:
the illumination-target member is constituted with a reflective liquid crystal element or a micro-mirror device.

11. A projector device equipped with an illuminating optical system according to claim 2.

12. A projector device according to claim 11, wherein:
the illumination-target member is constituted with a reflective liquid crystal element or a micro-mirror device.

13. An illuminating optical system, comprising:
a substantially rectangular-shaped light source that includes a light emitting surface with a split pattern formed thereon by a splitting line, the splitting line extending along a predetermined direction and splitting the light emitting surface into a plurality of separate areas;
an illumination-target member that includes a rectangular radiation-target area ranging along a lengthwise direction in which longer sides thereof extend and along a crosswise direction in which shorter sides thereof extend; and
an optical member that condenses light departing the light emitting surface so that an outline of an area irradiated with the light from the light emitting surface achieves a substantially rectangular shape and radiates the condensed light toward the radiation-target area by achieving varying levels of refractive power in correspondence to a rotation angle assumed around an optical axis of the optical member, wherein:
the light source is disposed so that the shorter sides of the radiation-target area are set substantially parallel to the predetermined direction at the radiation-target area.

* * * * *